United States Patent [19]
Cassidy

[11] Patent Number: 5,693,926
[45] Date of Patent: Dec. 2, 1997

[54] DIFFERENTIAL PRESSURE INDICATORS

[75] Inventor: Ronald F. Cassidy, Waterlooville, United Kingdom

[73] Assignee: Pall Corporation, East Hills, N.Y.

[21] Appl. No.: 589,896

[22] Filed: Jan. 23, 1996

[30] Foreign Application Priority Data

Jan. 23, 1995 [GB] United Kingdom ............ 9501253

[51] Int. Cl.$^6$ .................................................. H01H 35/38
[52] U.S. Cl. ............... 200/82 E; 73/745; 116/267; 340/607
[58] Field of Search ............... 116/70, 267, 268, 116/272; 200/82 C, 81.4, 82 E, 81.5, 81.9 M; 137/82, 625.62; 340/607; 73/744, 745

[56] References Cited

U.S. PATENT DOCUMENTS

| | | | |
|---|---|---|---|
| 3,140,690 | 7/1964 | Siebel | 116/70 |
| 3,495,566 | 2/1970 | Pall | 116/70 |
| 3,576,959 | 5/1971 | Bogodgoft | 200/84 E |
| 3,815,542 | 6/1974 | Cooper | 116/70 |
| 3,924,086 | 12/1975 | Ochsner | 200/82 R |
| 3,980,040 | 9/1976 | Read | 116/114 |
| 4,172,971 | 10/1979 | Silverwater et al. | 200/82 E |
| 4,203,384 | 5/1980 | Silverwater | 116/267 |
| 4,646,624 | 3/1987 | Stearns | 92/37 |
| 4,651,670 | 3/1987 | Silverwater | 116/268 |
| 4,654,140 | 3/1987 | Chen | 210/90 |
| 5,331,856 | 7/1994 | Cassidy | 73/745 |

FOREIGN PATENT DOCUMENTS

| | | |
|---|---|---|
| 0173841 | 3/1986 | European Pat. Off. |
| 966980 | 8/1964 | United Kingdom |
| 1221624 | 2/1971 | United Kingdom |
| 1412023 | 10/1975 | United Kingdom |
| 1476884 | 6/1977 | United Kingdom |
| 1525350 | 9/1978 | United Kingdom |
| 2207507 | 2/1989 | United Kingdom |

*Primary Examiner*—Gerald P. Tolin
*Attorney, Agent, or Firm*—Leydig, Voit & Mayer, Ltd.

[57] ABSTRACT

A double differential pressure indicator has a housing containing two pistons arranged in contiguous bores and biased by a single spring extending between opposed ends of the pistons. The differential pressure is applied across both pistons and as the pressure differential increases to a first predetermined difference one piston moves to operate a first indicator which may, for example, be a reed switch. As the differential pressure further increases, the second piston moves to operate a second indicating device which may be a button. In an alternative arrangement, both indicating devices operate at the same differential pressure.

25 Claims, 1 Drawing Sheet

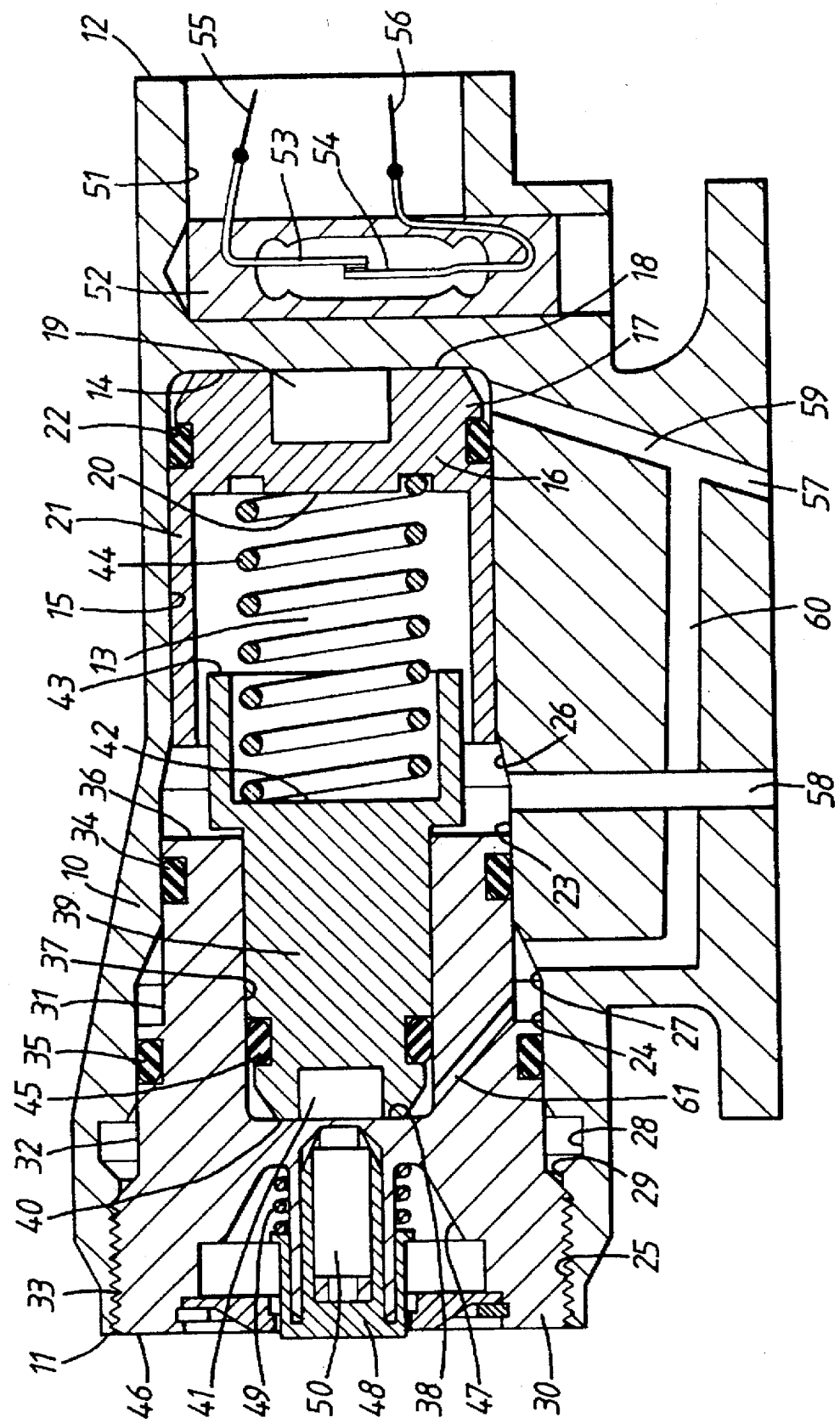

DIFFERENTIAL PRESSURE INDICATORS

BACKGROUND TO THE INVENTION

1. Field of the Invention

The invention relates to differential pressure indicators.

2. Brief Review of the Prior Art

Differential pressure indicators are used to provide an indication when a particular pressure difference is reached in the pressure of a fluid at two points along its flow path. For example, such indicators are used in association with filters to give an indication when the pressure difference between fluid upstream and downstream of the filter reaches a particular value. This can provide an indication of when the filter is becoming blocked and requires replacement.

SUMMARY OF THE INVENTION

According to the invention, there is provided a differential pressure indicator comprising a housing having a first inlet for connection to a source of a fluid at a higher pressure and a second inlet for connection to a source of fluid at a lower pressure, first and second pistons mounted for sliding movement in respective bores in the housing, each piston having opposed first and second ends, the first ends being connected to the first inlet and the second ends being connected to the second inlet, the first piston being operatively associated with a first indicating means and the second piston being operatively associated with a second indicating means, the arrangement being such that the first piston moves in the associated bore from an inoperative position to operate the first indicating means at a first pressure differential between the fluid in the first and second inlets and the second piston moves in the associated bore from an inoperative position to operate the second indicating means at a second pressure differential between the fluids in the first and second inlets.

In this way, a single indicator provides two indications of pressure differential. Indications may be given at the same differential pressure or at different differential pressures.

BRIEF DESCRIPTION OF THE DRAWING

The following is a more detailed description of an embodiment of the invention, by way of example, reference being made to the accompanying drawing which is a cross sectional view of a differential pressure indicator.

DESCRIPTION OF THE PREFERRED EMBODIMENT

The differential pressure indicator comprises a housing 10 which is generally elongate with opposed ends 11,12. One end 11 is formed with a bore 13 which extends into the housing 10, terminates at an end wall 14 and is provided with four stepped sections. The first bore section 15 is adjacent the end wall 14 and receives a first piston 16 having a head 17 with a first end surface 18 adjacent the end wall 14, in the position of the first piston 16 shown in the drawing. The head 17 carries a magnet 19 for a purpose to be described below.

The first piston 16 has a second end surface 20 facing in an opposite direction to the first end surface 18 and surrounded by an annular skirt 21. An annular seal 22 is carried by the head 17 and extends around the outer surface of the head 17 to seal with the bore section 15 to isolate the first end surface 18 from the second end surface 20.

The end of the first bore section 15 remote from the end wall 14 leads to second, third and fourth bore sections 23,24,25 of successively increasing diameters. A first sloping connecting portion 26 connects the first bore section 15 to the second bore section 23, a second sloping connecting portion 27 leads from the second bore section 23 to the third bore section 24 and an annular groove and rib 28,29 are provided between the third bore section 24 and the fourth bore section 25. The fourth bore section 25 terminates at the end 11 of the housing 10.

These sections, 23,24,25 receive a plug 30 which is generally annular and is provided with successive first, second and third exterior surfaces 31,32,33 which have diameters corresponding to the diameters of the second, third and fourth bore sections 23,24,25 respectively. Thus, the plug 30 fits tightly in the bore 13 with the co-operating sections and surfaces 23,31, 24,32 and 25,33 fitting tightly with one another. Seals 34,35 are provided on the first exterior surface 31 and the second exterior surface 32 to seal with the second bore section 23 and the third bore section 24 respectively.

The plug 30 has an end 36 within the housing 10 that is provided with a bore 37 extending into the plug and terminating in an end wall 38. Thus, the plug bore 37 is co-axial with, and extends in a direction opposite to the direction of, the first bore section 15. Thus the bores 15,37 are contiguous.

The plug bore 37 receives a second piston 39 mounted for sliding movement in the plug bore 37. The second piston 39 has a head including a first end surface 40 adjacent the end wall 38 and carrying a magnet 41 for a purpose to be described below. In the position of the second piston 39 shown in the drawing, the second end surface 42 of the second piston 39 is beyond the end of the plug bore 37 opposite the end wall. The second end surface 42 of the second piston 39 is surrounded by a skirt 43 which, as seen in the drawing, extends into the cavity defined by the skirt 21 of the first piston 16, with the second piston skirt 43 having an outer diameter which is less than the inner diameter of the first piston skirt 21.

A compression spring 44 extends between the second end surface 42 of the second piston 39 and the second end surface 20 of the first piston 16 so forcing the first and second pistons 16,39 into the inoperative positions shown in the drawing, where the first and second pistons 16,39 abut the associated end walls 14,38.

A seal 45 extends around the second piston and seals with the plug bore 37 to isolate the first end surface 40 of the second piston 39 from the second end surface 42 of the second piston 39.

The end 46 of the plug 30 adjacent the housing end 11 is provided with a cavity 47 which holds an indicator button 48 urged out of the cavity 47 by a spring 49 acting between the button 48 and the plug 30. The button 48 carries a magnet having a pole of one polarity adjacent a pole of opposite polarity of the magnet 41 carried by the second piston. Thus, in the inoperative position of the second piston 39 shown in the drawing, the button 48 is held in a depressed position in the cavity 47 by magnetic attraction between the magnets 50,41 against the action of the spring 49.

The other end 12 of the housing 10 is also provided with a cavity 51 that receives a reed switch 52. The switch 52 includes a pair of contacts 53,54 which, in the disposition shown in the drawing, are held in a "made" position by the action of the magnet 19 on the first piston 16. Each contact 53,54 is connected to an associated electrical lead 55,56, and the leads 55,56 extend to a control circuit and indicator device (not shown).

The housing 10 is provided with two inlets 57,58. One inlet 57 branches within the housing 10 with one branch 59 emerging on the first bore section 15 adjacent the end wall 14 and the other branch 60 emerging on the second connecting portion 27 between the second bore section 23 and the third bore section 24. A bore 61 extends through the plug 30 from a point on the first exterior surface 31 of the plug 30 adjacent the end of the branch 60 and a point on the plug bore 37 adjacent the end wall 38.

The second inlet 58 leads to a point on the second bore section 23 between the end 36 of the plug 30 and the start of the first bore section 15 in the housing 10.

In use, the differential pressure indicator described above with reference to the drawing is designed for use with a filter assembly where fluid under pressure is fed to a filter and filtered fluid leaves from the filter. The inlet 57 is connected to receive fluid from upstream of the filter and the inlet 58 is connected to receive fluid from downstream of the filter. The arrangement is such that, under normal operating conditions, the difference between the upstream and downstream pressures is insufficient to move the first and second pistons 16,39 from the inoperative positions shown in the drawing. However, as the filter clogs up with filtered material, the pressure differential between the upstream pressure and the downstream pressure increases. At a first differential pressure, determined by the areas of the first end surface 18 and the second end surface 20 and by the characteristics of the spring 44, the differential pressure across the first piston 16 will be such that sufficient force is generated on the first end surface 18 of the first piston 16 to move the first piston 16 against the action of the spring 44 from the inoperative position along the first bore section 15. This movement will cause the contacts 53,54 and the reed switch 52 to "unmake" and so generate a change of state which is detectable by the control circuit to provide an indication that the particular differential pressure has been reached.

The differential pressure is, of course, also applied across the second piston 39; in the case of the upstream pressure via the branch 60 and the bore 61. However, due to the smaller areas of the first and second ends 40,42 of the second piston 39 and the increased size of the second end 42 of the second piston in comparison with the first end 40 of the second piston 39, the second piston 39 retains the inoperative position even after the first piston 16 has moved. However, as the differential pressure increases to a second preset differential pressure, the differential pressure across the second piston 39 is sufficient to cause the second piston 39 to move from the inoperative position shown in the drawing against the action of the spring 44 and out of the plug bore 47. This moves the associated magnet 41 away from the magnet 50 of the button 48 so allowing the button 48 to spring out of the cavity 47 under the action of the spring 49. This gives a visual indication of the second pressure difference.

It will be appreciated that such first and second indications can be useful in a number of circumstances. The indication provided by the reed switch 52 can be used by an operative, whereas the indication provided by the button 48 can be used for maintenance purposes. One signal can be used to indicate "impending blockage" and the other to indicate "blockage".

It will be appreciated that the indicator need not be exactly as described above. The surface areas of the first and second pistons 16,39 could be the same so that the reed switch 52 and the button 48 operate at the same or substantially the same differential pressures. This can be used where the safety of a dual indication is required. The indications could be the other way round; the second piston 39 could operate a reed switch 52 and the first piston 16 could operate a button 48. The reed switch 52 could be replaced by a microswitch system. Where a reed switch is provided, it could be moved from an "unmade" to a "made" position on movement of the first piston 16 from the inoperative position by use of a biasing magnet or a double contact switch. The reed switch 52, or its equivalent could be arranged to provide two signals, one at each pressure.

The button 48 need not be moved by a spring 49; the second piston 39 could be provided with a magnetic arrangement such that the magnetic attraction varies from initially holding the button in the cavity, in the inoperative position of the second piston 39, to an opposing magnetic force making the button 48 move out of the cavity 47.

The differential pressure indicated as described above has the advantage that two indications are provided from a single device so saving space and weight. In addition, manufacturing costs are reduced because only one differential pressure measuring spring 44 is required; although separate springs could be provided. Improved reliability is gained which is further enhanced by having single connections to the housing 10 for upstream and downstream pressures.

I claim:

1. A differential pressure indicator comprising a housing having a first inlet for connection to a source of fluid at a higher pressure and a second inlet for connection to a source of fluid at a lower pressure, first and second pistons mounted for sliding movement in first and second bores in the housing respectively, each piston having opposed first and second ends, the first ends being connected to the first inlet so as to be at a pressure of the first inlet and the second ends being connected to the second inlet so as to be at a pressure of the second inlet, the first piston being operatively associated with a first indicating mechanism and the second piston being operatively associated with a second indicating mechanism, the arrangement being such that the first piston moves in the first bore from an inoperative position to operate the first indicating mechanism at a first pressure differential between the fluid in the first and second inlets and the second piston moves in the second bore from an inoperative position to operate the second indicating mechanism at a second pressure differential between the fluid in the first and second inlets.

2. An indicator according to claim 1 wherein the first piston bore and the second piston bore are co-axial and contiguous with the first piston being oppositely arranged to the second piston so that the second ends of the first and second pistons face one another, the second inlet leading to the contiguous ends of the first and second piston bores.

3. An indicator according to claim 2 wherein the first inlet has two branches within the housing, one leading to the first end of the first piston and the other leading to the first end of the second piston.

4. An indicator according to claim 2 wherein the first and second pistons are spring biased into the respective inoperative positions.

5. An indicator according to claim 4 wherein the pistons are biased by a single spring acting on and between the second ends of the first and second pistons.

6. An indicator according to claim 2 wherein the first differential pressure is different from the second differential pressure.

7. An indicator according to claim 6 wherein the areas of the first end and the second end of the first piston are greater than the areas of the first end and the second end, respectively, of the second piston so that the first piston moves from its inoperative position before the second piston moves from its inoperative position.

8. An indicator according to claim 7 wherein the diameter of the first piston is greater than the diameter of the second piston, the second end of the first piston being surrounded by an annular skirt and the second end of the second piston being surrounded by an annular skirt with the skirt of the second piston extending into the cavity defined by the skirt of the first piston.

9. An indicator according to claim 1 wherein the first and second pistons are spring biased into the respective inoperative positions.

10. An indicator according to claim 1 wherein the first differential pressure is different from the second differential pressure.

11. An indicator according to claim 10 wherein the areas of the first end and the second end of the first piston are greater than the areas of the first end and the second end, respectively, of the second piston so that the first piston moves from its inoperative position before the second piston moves from its inoperative position.

12. An indicator according to claim 1 wherein the first differential pressure is the same as the second differential pressure.

13. An indicator according to claim 12 wherein the areas of the first end and the second end of the first piston are the same as the areas of the first end and the second end, respectively, of the second piston.

14. An indicator according to claim 1 wherein the first indicating mechanism is an electrical switch operated on movement of the first piston from its inoperative position to indicate the first differential pressure.

15. An indicator according to claim 1 wherein the second indicating mechanism is a member which moves from a non-visible to a visible position when the second piston moves from its inoperative position to indicate the second differential pressure.

16. An indicator according to claim 14 wherein the electrical switch also provides an indication of the second differential pressure.

17. A differential pressure indicator comprising:

a housing having first and second inlets;

first and second pistons each slidably received in the housing for movement between first and second positions, each piston having a first region communicating with the first inlet so as to be at a fluid pressure of the first inlet and a second region communicating with the second inlet so as to be at a fluid pressure of the second inlet;

a first indicating mechanism actuated by movement of the first piston between its first and second positions; and a second indicating mechanism independent of the first indicating mechanism and actuated by movement of the second piston between its first and second positions.

18. An indicator according to claim 17 wherein the first and second pistons are nested when the pistons are in their second positions.

19. An indicator according to claim 17 wherein the second regions of the pistons oppose each other.

20. An indicator according to claim 17 wherein the indicating mechanisms are supported by the housing.

21. An indicator according to claim 17 including first and second magnets mounted on the first and second pistons, respectively, the first and second indicating mechanisms being responsive to movement of the first and second magnets, respectively.

22. An indicator according to claim 17 wherein each of the pistons in its first position contacts an end wall of a bore within the housing.

23. An indicator according to claim 17 wherein the areas of the first and second regions of the first piston are such that the first piston moves from its first to its second position at a first pressure differential between its first and second regions, and the areas of the first and second regions of the second piston are such that the second piston moves from its first to its second position at a second pressure differential between its first and second regions different from the first pressure differential.

24. An indicator according to claim 23 wherein the first and second regions of the first piston are larger than the first and second regions, respectively, of the second piston.

25. An indicator according to claim 17 including a biasing spring compressed between the first and second pistons at any position of the pistons.

* * * * *